United States Patent [19]
> Fisk et al.

[11] 4,082,816

[45] Apr. 4, 1978

[54] CAPROLACTONE POLYMERS FROM UNSATURATED MONOMERS

[75] Inventors: William W. Fisk; Howard J. Wright, both of Kansas City, Mo.

[73] Assignee: Cook Paint and Varnish Company, Kansas City, Mo.

[21] Appl. No.: 466,845

[22] Filed: May 3, 1974

Related U.S. Application Data

[62] Division of Ser. No. 289,638, Sep. 18, 1972, abandoned.

[51] Int. Cl.² ...................... C08G 63/08; C08L 61/26
[52] U.S. Cl. ........................... 260/855; 260/78.3 UA; 260/856; 427/388 B
[58] Field of Search ............. 260/856, 78.3 R, 78.3 U, 260/855

[56] References Cited

U.S. PATENT DOCUMENTS

| Re. 27,151 | 6/1971 | Hicks | 260/78.3 UA |
|---|---|---|---|
| 3,169,945 | 2/1965 | Hostettler et al. | 260/78.3 UA |
| 3,379,794 | 4/1968 | King et al. | 260/78.3 UA |
| 3,598,790 | 8/1972 | Kollinsky et al. | 260/78.3 UA |
| 3,640,971 | 2/1972 | Katayama et al. | 260/78.3 R |
| 3,655,631 | 4/1972 | Fraser et al. | 260/78.3 R |

*Primary Examiner*—John C. Bleutge
*Attorney, Agent, or Firm*—Cushman, Darby & Cushman

[57] ABSTRACT

A caprolactone-modified acrylic polymer comprising the product obtained by polymerizing a mixture of vinyl monomers, including at least one such monomer containing a —COOH and/or —OH group, with caprolactone.

1 Claim, No Drawings

CAPROLACTONE POLYMERS FROM UNSATURATED MONOMERS

This is a division of application Ser. No. 289,638 filed Sept. 18, 1972, now abandoned.

BACKGROUND OF THE INVENTION

The invention is concerned with caprolactone-containing vinyl polymers and coating compositions containing the same.

It is known that ε-caprolactone of the formula:

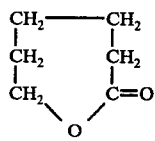

will react with acids or alcohols by ring-opening between the —O— and the adjacent keto group to form various kinds of adducts. Thus, with an acid RCOOH, the caprolactone opens and reacts as follows:

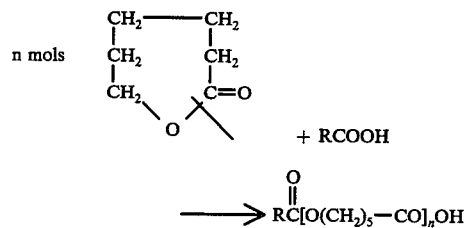

where $n$ is an integer.

With an alcohol ROH, the caprolactone ($n$ mols) splits in the same way to give:

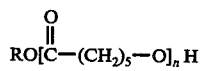

It will be evident from the above that the reaction of the acid or alcohol with the caprolactone can be used to introduce terminal —COOH and/or —OH groups in the product.

The invention is based on the finding that by polymerizing together (1) a mixture of vinyl monomers, including at least one such monomer containing an —OH or —COOH group, and (2) an ε-caprolactone, the resulting polymer demonstrates certain particularly useful properties for coating purposes. For example, the resulting product reacts particularly well with conventional melamine-formaldehyde precondensates to give coatings or films which show outstanding exposure resistance and are particularly useful as metal coil coatings or the like. Accordingly, the principal object of the invention is to provide certain acrylic copolymers which are uniquely useful, particularly with amino-formaldehyde precondensates, for coating purposes. Other objects will also be hereinafter apparent.

SUMMARY OF THE INVENTION

Broadly speaking, the invention is concerned with the preparation of a caprolactone-modified acrylic polymer suitable for use in a coating composition by polymerizing a mixture of vinyl monomers, including at least one monomer containing a —COOH and/or —OH functional group, with ε-caprolactone. The resulting polymer is advantageously used for coating purposes by blending with a thermosetting or cross-linking aminoaldehyde precondensate, e.g. a melamine-formaldehyde precondensate, applying to a suitable substrate, e.g. metal and then baking.

DETAILED DESCRIPTION OF THE INVENTION

The vinyl monomer containing the —OH and/or —COOH group may be an unsaturated acid such as acrylic acid, methacrylic acid, itaconic acid, maleic acid, fumaric acid or crotonic acid; a lower alkyl hydroxy acrylic compound such as hydroxy propyl methacrylate, hydroxy ethyl methacrylate, hydroxy butyl methacrylate, hydroxy ethyl acrylate, hydroxy propyl acrylate, or hydroxy butyl acrylate. Mixtures of such acids and/or hydroxy monomers may also be used, e.g. a mixture of acrylic acid and hydroxy propyl methacrylate. An example of a vinyl monomer containing —OH and —COOH groups is hydroxy propyl acid maleate.

The mixture of vinyl monomers used herein should also include one or more acrylic or other vinyl monomers which are free from —OH and —COOH groups. Typical of such monomers are styrene, α-substituted lower alkyl styrenes such as α-methyl styrene, alkyl esters of acrylic and methacrylic acids, especially the lower alkyl esters thereof, e.g. methyl methacrylate, methyl and ethyl acrylate; acrylonitrile, methacrylonitrile, acrylamide and mixtures of these materials.

The polymerization is preferably carried out in the presence of a polymerization catalyst, typically, peroxides such as benzoyl peroxide, di-tertiarybutylperoxide, di-cumene peroxide and methyl-ethyl ketone peroxide, or other catalysts of the free-radical type.

In addition to the free radical polymerization catalyst, the polymerization medium should include a polymerization catalyst for the caprolactone. Typically this may be an alkali or alkaline earth metal alkoxide, e.g. sodium or calcium methoxide; aluminum isopropoxide, tetraalkyl titanates, titanium chelates and acylates, lead salts and lead oxides, zinc borate, antimony oxide, organic acids, inorganic acids such as sulfuric, hydrochloric, and phosphoric, and Lewis acids such as boron trifluoride.

The polymerization is advantageously carried out in solution using such conventional solvents as aromatic hydrocarbons, typically benzene, toluene, xylene, ketones, esters, and the like. Any solvent can be used provided it is free from groups which are reactive under the polymerization conditions.

In one preferred way of operating, the solvent, or at least most of it, is charged together with the caprolactone polymerization catalyst to a flask and heated followed by gradual addition of a mixture of the caprolactone, vinyl monomers and free radical catalyst, to the heated mixture of solvent and caprolactone catalyst. Normally this addition will be extended over a period of from 1-5 hours after which the mixture is heated until the desired degree of reaction is attained. Advantageously the polymerization is carried out at reflux but a wide range of temperatures, e.g. about 110°-200° C or higher, can be used. The polymerization is usually completed in 2-6 hours after all of the components have been mixed together. The polymerization is considered complete when a constant viscosity is obtained.

While proportions can be varied, the amount of caprolactone used will generally be in the range of 0.25-2 mols per —OH and/or —COOH equivalent in the monomer mixture undergoing polymerization. It will be appreciated, however, that more than 2 mols of caprolactone, e.g. 10–15 mols or more, can be used per —OH and/or —COOH equivalent in the monomer mixture.

The proportions of —OH and/or —COOH monomer to other vinyl monomer or monomers used herein can be widely varied but usually it is preferred to use on a weight basis, 60–98% of acrylic or other vinyl monomer which is free from functional —OH and —COOH groups and 40–2% of the acrylic or vinyl monomer (or monomer mixture) containing one or more —OH and/or —COOH groups.

The caprolactone-modified vinyl polymers of the invention may be used in coating compositions by blending with melamine resins, e.g. alkylated or alkoxylated melamine-formaldehyde condensates, applying to the desired substrate, e.g. a metal such as steel, iron, zinc, etc., followed by baking under conventional temperature and time conditions, such as 85° to 260° C for 30 minutes to 30 seconds. Conventional ratios of vinyl polymer to melamine-formaldehyde resin are used, e.g. 50–90 parts vinyl polymer to 10–50 parts melamine resin.

Any of the well known melamine-formaldehyde resins which are normally used in coating compositions with acrylics can be used herein, e.g. the butylated melamine-formaldehyde resin shown in Example X of U.S. Pat. No. 3,215,756. Particularly useful results are obtained with "Cymel" methoxylated melamine-formaldehyde resins, e.g. "Cymel" 300, when the caprolactone-modified polymer is made with an acrylic monomer containing a —COOH functional group and, therefore, has a relatively high acid number. Butylated or like alkylated melamine-formaldehyde resins are usually preferred when a monomer containing an —OH functional group is used and the acid number is lower. Usually, when using an —OH functional monomer, the acid number of the vinyl polymer is in the range of 5–20 while a somewhat higher acid number (usually about 30–60) is obtained using a monomer containing a —COOH functional group. Using the methoxylated melamine-formaldehyde condensates with the acrylic polymers of higher acid number (e.g. 30–60) seems to give a faster cure although outstanding results are also obtained with the alkylated melamine-formaldehyde condensates. While acrylic monomer mixtures containing only —OH or —COOH groups give excellent results, there may be special situations in which better results are obtained using a monomer or monomer mixture containing both —OH and —COOH groups.

The invention is illustrated by the following examples wherein parts and percentages are by weight unless otherwise stated:

EXAMPLE 1

8 parts xylene, 15.57 parts Solvesso 100 (aromatic high boiling solvent) and 0.03 parts tetraisopropyl titanate were added to a flask and brought to reflux (about 140° C). The following materials were mixed together and then added gradually (over about 3–3½ hours) to the flask while maintaining reflux:

|  | Parts |
|---|---|
| ethyl acrylate | 35.00 |
| methacrylonitrile | 13.3 |
| styrene | 13.65 |
| acrylic acid | 3.15 |
| t-butyl perbenzoate | .50 |
| t-butyl peroctoate | .50 |
| ε-caprolactone | 4.90 |

The ε-caprolactone and acrylic acid in the above formulation were in equimolar ratios.

Thereafter 5 parts of xylene and 0.2 parts each of t-butyl perbenzoate and di-t-butyl peroxide were added to the above mixture and polymerization was completed by refluxing the contents of the flask for another 4 hours. The reaction mixture was then reduced to 50% nonvolatiles by the addition of 20 parts xylene, 10 parts Cellosolve acetate and 10 parts butyl alcohol. The resulting product had a viscosity of V-W (Gardner-Holdt) and an acid number of 35 ± 1.

80 parts of this product were mixed with 20 parts of "Cymel" 300 (methoxylated melamine-formaldehyde precondensate) and coated onto a metal substrate, specifically aluminum coils, followed by baking at 150° C for 15 minutes. This gave a coil coating which had outstanding properties characterized particularly by its excellent flexibility.

EXAMPLE 2

23.83 parts xylene and 0.02 parts of tetraisopropyl titanate were put into a flask and brought to reflux after which the following mixture was added thereto gradually:

|  | Parts |
|---|---|
| styrene | 23.45 |
| butyl methacrylate | 29.75 |
| hydroxy propylmethacrylate | 11.16 |
| ε-caprolactone | 8.55 |
| acrylic acid | 1.50 |
| di-t-butyl peroxide | 0.50 |

The resulting mixture was refluxed for four hours and then reduced to 50% nonvolatiles by the addition of 50 parts xylene to give a product having a Y viscosity and an acid number of 19 ± 1. The product was mixed with butylated melamine-formaldehyde-condensate made according to Example X of U.S. Pat. No. 3,215,756 (on a 70:30 weight basis) to give a composition which, on coating onto a metal substrate and baking (e.g. at 150° C for 15 minutes), gave a clear, flexible, highly desirable film with outstanding resistance to exposure.

EXAMPLE 3

24.08 parts xylene and 0.02 parts tetraisopropyl titanate were added to a flask and brought to reflux after which the following were added gradually while maintaining reflux:

|  | Parts |
|---|---|
| styrene | 24.1 |
| butyl methacrylate | 13.1 |
| 2-ethylhexyl methacrylate | 3.45 |
| butyl acrylate | 4.87 |
| ethyl acrylate | 16.5 |
| hydroxyethyl acrylate | 6.18 |
| acrylic acid | .69 |
| di-t-butyl peroxide | .90 |

Thereafter 6.11 parts ε-caprolactone were added over a period of about an hour. The mixture was then held at reflux for 3-5 hours and thereafter reduced with 42.5 parts xylene and 7.5 parts butyl alcohol to 50% nonvolatiles. The resulting product had a viscosity of U-V and an acid number of 7 ± 1. It gives outstanding coatings when mixed with conventional heat setting melamine-formaldehyde precondensates, including methoxylated melamine-formaldehyde derivatives such as "Cymel" 300.

EXAMPLE 4

49 parts xylene and 0.01 parts tetraisopropyl titanate were added to a flask and brought to reflux (about 141° C). The following materials were then mixed together:

|  | Parts |
| --- | --- |
| styrene | 11.93 |
| hydroxy propyl methacrylate | 10.08 |
| ε-caprolactone | 7.98 |
| methyl methacrylate | 20.00 |
| di-t-butyl peroxide | 1.00 |

This last-mentioned mixture was then added to the flask, at reflux, over a 4 hour period. The mixture was held at reflux for another 3½ hours. The product was reduced to 50% nonvolatiles by addition of xylene. The acid number was about 8.5. The product reacted well with melamine-formaldehyde precondensate on baking to give outstanding coatings on metal (steel), glass and other substrates.

EXAMPLE 5

18.71 parts xylene and 0.01 parts tetraisopropyl titanate were added to a flask and brought to reflux. The following were then mixed together and then added to the flask, while refluxing, over a period of 3½-4 hours:

|  | Parts |
| --- | --- |
| styrene | 20.85 |
| butyl methacrylate | 27.50 |
| 2-ethylhexyl acrylate | 8.95 |
| hydroxy propyl methacrylate | 12.42 |
| ε-caprolactone | 4.42 |
| methacrylic acid | 1.48 |
| di-t-butyl peroxide | .33 |

5 parts of xylene and 0.33 parts of di-t-butyl peroxide were then added over an hour. The mixture was held at reflux for 3-5 hours and then reduced to 50% nonvolatiles with the addition of 50 parts xylene. The product had a Y viscosity and an acid number of 16 ± 1. It gave excellent films when mixed with melamine-formaldehyde and baked on a substrate.

EXAMPLE 6

This example illustrates the preparation of a product using two mols caprolactone per mol of hydroxy propyl methacrylate, Example 5 being illustrative of the case where 0.5 mole caprolactone is used per mol of hydroxy propyl methacrylate.

23.12 parts xylene and 0.04 parts tetraisobutyl titanate were added to a flask and refluxed. The following materials were then mixed together and added to the flask, while refluxing, over 3-3½ hours:

|  | Parts |
| --- | --- |
| styrene | 17.85 |
| methyl methacrylate | 10.12 |
| butyl acrylate | 10.11 |
| ethyl acrylate | 15.47 |
| hydroxy propyl methacrylate | 7.58 |
| acrylic acid | .60 |
| ε-caprolactone | 13.28 |
| di-t-butyl peroxide | 1.00 |

The resulting mixture was held at reflux (about 140° C) for 3-5 hours and then reduced with 42.5 parts xylene and 7.5 parts butyl alcohol to 50% ± 1 nonvolatile. The reduced product had a viscosity of T-U and an acid number of 9 ± 1. It gave excellent coatings when mixed with melamine-formaldehyde precondensates, e.g. butylated melamine-formaldehyde resin made according to Example X of U.S. Pat. No. 3,215,756, and baked.

It will be recognized that various modifications may be made in the invention described above without deviating from the scope thereof as defined in the following claims wherein:

We claim:

1. A process for preparing a composition comprising (a) a caprolactone-modified vinyl polymer and (b) a melamine-formaldehyde, said process comprising polymerizing caprolactone with a mixture of vinyl monomers including (1) from 60-98% by weight of a monomer selected from the group consisting of styrene, α-substituted lower alkyl styrenes, lower alkyl esters of acrylic and methacrylic acids, acrylonitrile, methacrylonitrile, acrylamide and mixtures thereof and (2) from 40-2% by weight of at least one monomer containing a —COOH and/or —OH group, the monomer containing said —COOH or —OH group being selected from the group consisting of hydroxy alkyl acrylates and methacrylates, acrylic acid, methacrylic acid, fumaric acid, crotonic acid, itaconic acid and maleic acid and the amount of caprolactone being in the range of 0.25-15 moles per —OH and —COOH equivalent in the monomer mixture and thereafter adding said melamine-formaldehyde to the resulting polymer.

* * * * *